(12) United States Patent
Wei et al.

(10) Patent No.: US 12,177,878 B2
(45) Date of Patent: Dec. 24, 2024

(54) BANDWIDTH PART SWITCHING METHOD AND APPARATUS, SERVING NODE, USER TERMINAL, AND MEDIUM

(71) Applicant: ZTE CORPORATION, Guangdong (CN)

(72) Inventors: Xingguang Wei, Guangdong (CN); Jian Li, Guangdong (CN); Peng Hao, Guangdong (CN); Yu Ngok Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 595 days.

(21) Appl. No.: 17/607,683

(22) PCT Filed: Apr. 27, 2020

(86) PCT No.: PCT/CN2020/087263
§ 371 (c)(1),
(2) Date: Oct. 29, 2021

(87) PCT Pub. No.: WO2020/221210
PCT Pub. Date: Nov. 5, 2020

(65) Prior Publication Data
US 2022/0191880 A1 Jun. 16, 2022

(30) Foreign Application Priority Data

Apr. 30, 2019 (CN) .......................... 201910364312.3

(51) Int. Cl.
*H04W 72/542* (2023.01)
*H04L 27/26* (2006.01)
(Continued)

(52) U.S. Cl.
CPC ..... *H04W 72/542* (2023.01); *H04L 27/26025* (2021.01); *H04W 72/044* (2013.01); *H04W 72/23* (2023.01)

(58) Field of Classification Search
None
See application file for complete search history.

(56) References Cited

U.S. PATENT DOCUMENTS

2019/0104543 A1* 4/2019 Park .................... H04W 74/006

FOREIGN PATENT DOCUMENTS

| CN | 109417739 A | 3/2019 |
|----|-------------|--------|
| CN | 110536444 A | 12/2019 |

(Continued)

OTHER PUBLICATIONS

WIPO, International Search Report issued on Jun. 17, 2020.
(Continued)

*Primary Examiner* — Alex Skripnikov
(74) *Attorney, Agent, or Firm* — Li & Cai Intellectual Property (USA) Office

(57) ABSTRACT

The present application provides a bandwidth part switching method and apparatus, a serving node, a user terminal, and a medium. The bandwidth part switching method includes: determining switch slot offsets of bandwidth part switching process for respective cells in a serving node, a switch delay of each switch slot offset in a corresponding cell being greater than or equal to the required switch delay for the cell; and sending switching indication information to a user terminal, wherein the switching indication information includes the respective switch slot offsets.

16 Claims, 4 Drawing Sheets

Receive switching indication information sent from a serving node, wherein the switching indication information includes switch slot offsets of bandwidth part switching process for respective cells in the serving node, and a switch delay of each switch slot offset in a corresponding cell is greater than or equal to a required switch delay for the cell ~S100

Perform bandwidth part bundle switching according to the switching indication information ~S200

(51) Int. Cl.
*H04W 72/044* (2023.01)
*H04W 72/23* (2023.01)

(56) References Cited

FOREIGN PATENT DOCUMENTS

EP          3860214 A1      8/2021
WO     WO-2020194741 A1 * 10/2020   ........... H04L 5/0035

OTHER PUBLICATIONS

LG Electronics. "Remaining issues on bandwidth part operation," 3GPP TSG RAN WG1 Meeting #92bis, Sanya, China, Apr. 7, 2018.
Mediatek Inc. "NR UE Power Saving Designs," 3GPP TSG RAN WG1 Meeting #96, Athens, Greece, Feb. 23, 2019.

* cited by examiner

TITLE: BANDWIDTH PART SWITCHING METHOD AND APPARATUS, SERVING NODE, USER TERMINAL, AND MEDIUM

CROSS-REFERENCE TO RELATED APPLICATION

The present disclosure claims priority from the Chinese patent application No. 201910364312.3 filed with the China Patent Office on Apr. 30, 2019, and the entire contents of which are incorporated in the present disclosure by reference.

TECHNICAL FIELD

The present disclosure relates to wireless communication networks, and for example, relates to a bandwidth part switching method and apparatus, a serving node, a user terminal, and a medium.

BACKGROUND

The Fifth Generation (5G) mobile communication system supports a larger system bandwidth than the conventional wireless communication system, and introduces the concept of bandwidth part (BWP). BWP refers to a section of continuous bandwidth, by which a user equipment (UE) only needs to support data transceiving within the partial bandwidth of the BWP, instead of supporting data transceiving within the entire system bandwidth. Each UE has only one active uplink BWP and one active downlink BWP at the same time, and the UE may dynamically adjust the active BWP according to the traffic condition. The bandwidth part bundle switching involves BWP switching on multiple cells in a serving node. The BWP switch delays on different cells may not be the same, and the BWP switching on different cells may affect each other. During the communication between the serving node and the UE, if the UE does not complete the BWP switching on all cells, effective data transceiving and synchronization between the base station and the UE may not be implemented, thereby affecting the communication quality.

SUMMARY

The present disclosure provides a bandwidth part switching method and apparatus, a serving node, a user terminal, and a medium, which can improve the reliability of bandwidth part switching for respective cells and improve the communication quality.

An embodiment of the present disclosure provides a bandwidth part switching method, including: determining switch slot offsets of bandwidth part switching process for respective cells in a serving node, wherein a switch delay of each switch slot offset in a corresponding cell is greater than or equal to a required switch delay for the cell; and sending switching indication information to a user terminal, wherein the switching indication information includes the respective switch slot offsets.

An embodiment of the present disclosure further provides a bandwidth part switching method, including: receiving switching indication information sent from a serving node, wherein the switching indication information includes switch slot offsets of bandwidth part switching process for respective cells in the serving node, and a switch delay of each switch slot offset in a corresponding cell is greater than or equal to a required switch delay for the cell; and performing bandwidth part bundle switching according to the switching indication information.

An embodiment of the present disclosure further provides a bandwidth part switching apparatus, including: a switch slot determining module configured to determine switch slot offsets of bandwidth part switching process for respective cells in a serving node, wherein a switch delay of each switch slot offset in a corresponding cell is greater than or equal to a required switch delay for the cell; and a transmitting module configured to send switching indication information to a user terminal, wherein the switching indication information includes the respective switch slot offsets.

An embodiment of the present disclosure further provides a bandwidth part switching apparatus, including: a receiving module configured to receive switching indication information sent from a serving node, wherein the switching indication information includes switch slot offsets of bandwidth part switching process for respective cells in the serving node, and a switch delay of each switch slot offset in a corresponding cell is greater than or equal to a required switch delay for the cell; and a switching module configured to perform bandwidth part bundle switching according to the switching indication information.

An embodiment of the present disclosure further provides a serving node, including: one or more processors; and a storage device configured to store one or more programs; wherein the one or more programs are executed by the one or more processors so that the one or more processors implement the bandwidth part switching method as described above.

An embodiment of the present disclosure further provides a user terminal, including: one or more processors; and a storage device configured to store one or more programs; wherein the one or more programs are executed by the one or more processors so that the one or more processors implement the bandwidth part switching method as described above.

An embodiment of the present disclosure further provides a computer readable storage medium having a computer program stored thereon, which computer program, when executed by a processor, causes the bandwidth part switching method as described above to be implemented.

DETAIL DESCRIPTION OF EMBODIMENTS

Figure 1:
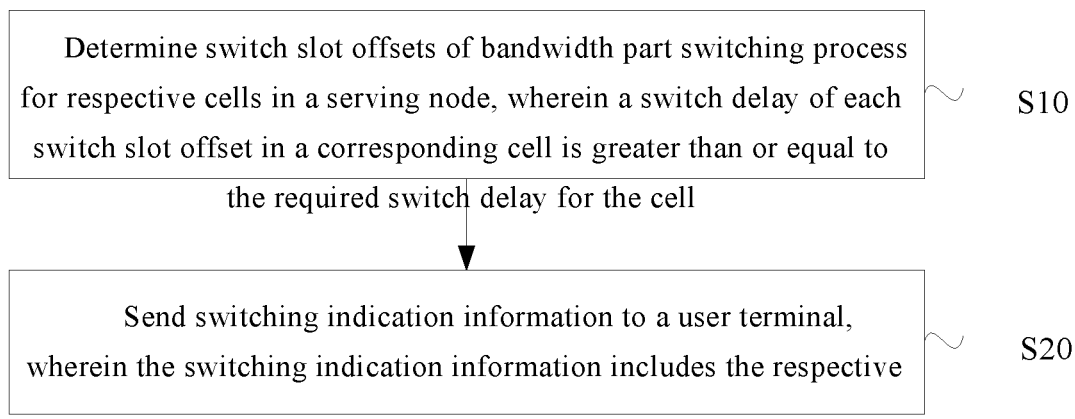
FIG. 1 is a flowchart of a bandwidth part switching method according to an embodiment.

The present disclosure will now be described in detail with reference to the following examples. It should be noted that, the following description of some embodiments presented herein is for the purpose of illustration and description only. It is not intended to be exhaustive or to be limited to the precise form disclosed.

The present disclosure will be described with reference to the accompanying drawings and embodiments. It should be noted that the embodiments of the disclosure and features therein may be combined with each other in any manner as long as they are not contradictory. It should be further noted that, for the convenience of description, only some of the structures associated with the present disclosure are shown in the drawings, not all of them.

The 5G mobile communication system supports a larger system bandwidth than the conventional wireless communication system. According to the Third Generation Partnership Project (3GPP) protocol TS38.101-2, the 5G system supports a maximum system bandwidth of 400 MHz. For the user terminal, supporting such a large system bandwidth increases not only the cost, but also the power consumption. Based on the BWP technology, the UE only needs to support data transceiving within a partial bandwidth of the BWP, and the UE may switch the active BWP according to actual requirements.

The bandwidth part bundle switching involves BWP switching on multiple cells in a serving node. In a 5G system, each UE may be configured with at most 4 uplink BWPs and 4 downlink BWPs on each carrier. At the same time, each UE can have only one active uplink BWP and one active downlink BWP. Each BWP may be configured differently, and the UE dynamically adjusts the active BWP according to the traffic condition. In an embodiment, the UE is configured with 2 downlink BWPs, i.e., BWP1 and BWP2, with BWP1 having a relatively large bandwidth and BWP2 having a relatively small bandwidth. In the case that the UE has more downlink services, the UE may activate BWP1 for downlink traffic transmission; and in the case that the UE has less downlink services, the UE may switch to BWP2 to save energy.

After receiving the BWP switching indication information, the UE requires a period of time to prepare and perform the BWP switching, which period of time is called BWP switch delay. The related art can only ensure that the switch delay is greater than or equal to a required switch delay of the current cell which actively initiates the BWP switching, but does not consider the BWP switch delays on other cells. Aiming at the problems of low BWP switching reliability and lack of effective data transceiving and synchronization between the serving node and the UE due to failure to consider the required switch delay on each cell in the BWB bundle switching technology, an embodiment of the present disclosure provides a bandwidth part switching method that indicates a reasonable switch slot offset for each cell, thereby improving the reliability of bandwidth part switching for respective cells as well as the communication quality.

FIG. 1 is a flowchart of a bandwidth part switching method according to an embodiment. As shown in FIG. 1, the method is applied to a serving node, and includes steps S10 and S20.

At step S10, determining switch slot offsets of bandwidth part switching process for respective cells in a serving node. A switch delay of each switch slot offset in a corresponding cell is greater than or equal to the required switch delay for the cell.

At step S20, sending switching indication information to a user terminal. The switching indication information includes the respective switch slot offsets.

In an embodiment, the BWP switching is implemented by at least one of: downlink control information (DCI) switching, radio resource control (RRC) signaling switching, and inactivity timer switching. The DCI switching involves indicating BWP switching by DCI sent to the UE from a serving node, and the UE determines a target uplink BWP and a target downlink BWP according to bandwidth part indicators in DCI format 0_1 and DCI format 1_1, respectively. The RRC signaling switching involves indicating BWP switching by RRC signaling sent to the UE from the serving node, and the UE determines a target uplink BWP and a target downlink BWP according to a first active uplink BWP identity and a first active downlink BWP identity in the RRC signaling. The inactivity timer switching refers to the following: when the BWP inactivity timer of the UE expires, the UE switches the downlink BWP to the default downlink BWP whose BWP ID is the default downlink BWP-ID.

Figure 2:
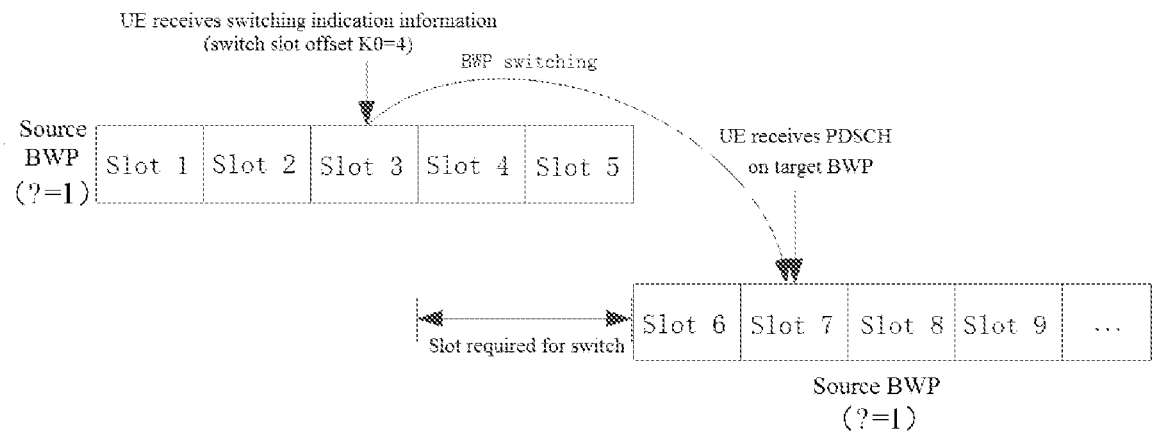
FIG. 2 is a schematic diagram of bandwidth part switching according to an embodiment.

FIG. 2 is a schematic diagram of bandwidth part switching according to an embodiment. As shown in FIG. 2, the bandwidth part switching means that the serving node indicates the UE to switch from a source BWP to a target BWP. After receiving, in slot 3 of the source BWP, the switching indication information sent from the serving node, the UE executes the BWP switching. Assuming that the source BWP and the target BWP each have a subcarrier spacing of 30 KHz (corresponding to $\mu=1$), and a UE capability corresponds to the first type. In this case, two slots are required for the BWP switching. If 2 slots are required for completing the BWP switching in the current cell, the serving node indicates a switch slot offset of 4 to the UE, which is greater than or equal to the required switch slot; there is sufficient time for the UE to complete the BWP switching within the switch slot offset of 4, and the UE switches to slot 7 of the target BWP and receives a physical downlink shared channel (PDSCH) in slot 7. If 6 slots are required for completing the BWP switching in the current cell, and a switch slot offset of 4 are indicated to the UE, the BWP switching cannot be completed in time, thereby affecting the communication between the serving node and the UE.

Figure 3:
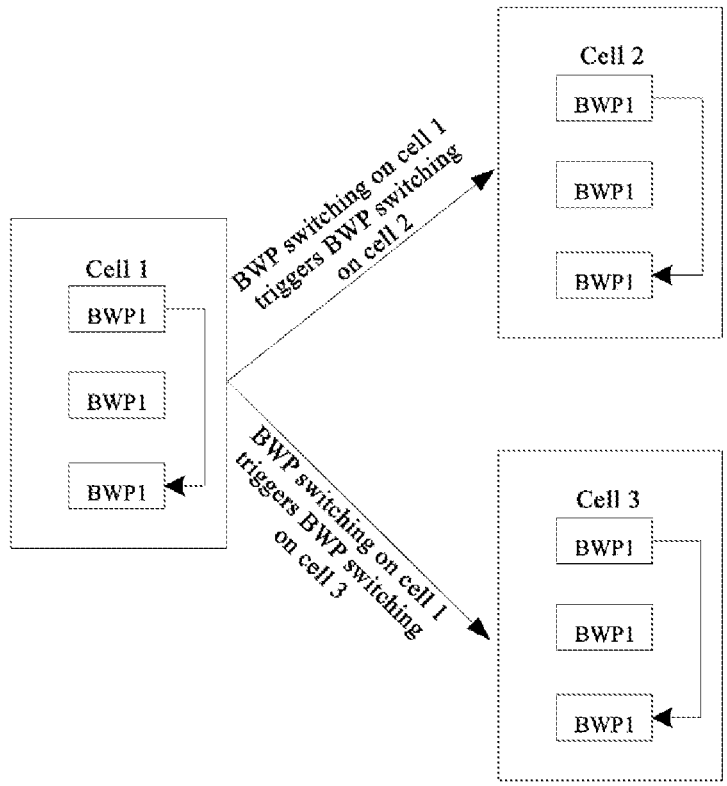
FIG. 3 is a schematic diagram of bandwidth part bundle switching according to an embodiment.

FIG. 3 is a schematic diagram of bandwidth part bundle switching according to an embodiment. As shown in FIG. 3, BWP bundle configures the BWP bundling relationship between cell 1 and cell 2 and the BWP bundling relationship between cell 1 and cell 3, and, when cell 1 is switched from BWP 1 to BWP 2, cells 2 and 3 are also triggered to switch from BWP 1 to BWP 2.

In an embodiment, the serving node includes at least two cells. The cell is an active cell or a passive cell. The active cell is a cell actively initiating the bandwidth part switching in the serving node, and the passive cell is a cell passively initiating the bandwidth part switching in the serving node. In FIG. 3, cell 1 is an active cell, and cell 2 and 3 are passive cells.

The switch delay of BWP is related to a subcarrier spacing type of Band a UE capability, 3GPP TS38.133 [2] defines the required switch slots for different subcarrier spacing types and different UE capabilities in different switching scenarios. Table 1 is a look-up table of the required switch slots and related parameters.

TABLE 1

Required switch slots vs. related parameters

| Subcarrier spacing type (μ) | Slot length (in millisecond) | Required switch slot First type (Type 1) | Required switch slot Second type (Type 2) |
|---|---|---|---|
| 0 | 1 | [1] | [3] |
| 1 | 0.5 | [2] | [5] |
| 2 | 0.25 | [3] | [9] |
| 3 | 0.125 | [6] | [17] |

As shown in Table 1, in one cell for example, when the subcarrier spacing type μ is 2 (corresponding to a slot length of 0.25 ms) and the UE type corresponding to the UE capability is the first type, the required switch slot is 3, and the UE needs at least 3 switch slot offsets to complete the BWP switching, in which case the required switch delay is 0.25 ms*3=0.75 ms.

Table 2 is a look-up table of subcarrier spacing types and subcarrier spacings.

For a cell, the subcarrier spacing of the cell is known and the subcarrier spacing type of the cell can be determined according to Table 2. For example, if the subcarrier spacing of a cell is 30 KHz, then the cell has a subcarrier spacing type μ=1.

TABLE 2

Subcarrier spacing types vs. subcarrier spacing

| μ | $\Delta f = 2^\mu \cdot 15$ [kHz] |
|---|---|
| 0 | 15 |
| 1 | 30 |
| 2 | 60 |
| 3 | 120 |
| 4 | 240 |

In an embodiment, the switch slot offset includes at least one of a first switch slot offset and a second switch slot offset. The first switch slot offset is a switch slot offset of an uplink bandwidth part, and the second switch slot offset is a switch slot offset of a downlink bandwidth part.

In an embodiment, the first switch slot offset K0 is configured to indicate a switch slot offset of a bandwidth part of a PDSCH, and the second switch slot offset K2 is configured to indicate a switch slot offset of a physical uplink shared channel (PUSCH). The switching indication information sent from the serving node includes a value of K0 or K2 for each cell, and by reasonably indicating the value of K0 or K2, a sufficient time period is reserved, thereby ensuring that the UE has completed the BWP switching before receiving PDSCH and transmitting PUSCH.

In an embodiment, the first switch slot offset K0 is configured to indicate a switch slot offset of a bandwidth part of a PDSCH, and the second switch slot offset K2 is configured to indicate a switch slot offset of a physical uplink shared channel (PUSCH). The switching indication information sent from the serving node includes values of K0 or K2 for an active cell only, and by reasonably indicating the values of K0 or K2, a sufficient time period is reserved, thereby ensuring that the UE has completed the BWP switching before receiving PDSCH and transmitting PUSCH.

In an embodiment, the step of determining switch slot offsets of bandwidth part switching process for respective cells in the serving node includes: calculating, according to a subcarrier spacing type in each cell and a user terminal type, the required switch delays for the user terminal switching in the respective cells; and determining, according to a maximum value of the required switch delays, the respective switch slot offsets.

In an embodiment, for cells 1 to n, cell 1 is an active cell, the BWP switching of cell 1 triggers the BWP switching of cells 2 to n, and thus cells 2 to n are passive cells. Firstly, the required switch delays for respective cells are calculated based on Table 1 from the UE type and the subcarrier spacing type thus obtaining the required switch delay 1, the required switch delay 2 . . . the required switch delay n; and the respective switch slot offsets are determined according to the maximum value max {the required switch delay 1, the required switch delay 2 . . . the required switch delay n} among the required switch delays for respective cells, where n is the number of cells in the serving node and is a positive integer.

In an embodiment, K0 and K2 for the active cell in the switching indication information satisfy the conditions that:
  a switch delay corresponding to K0 is greater than or equal to the maximum value among the required switch delays for this downlink BWP in the active cell and all the passive cells, i.e.:
  K0 corresponds to a switch delay≥max {the required downlink switch delay 1, the required downlink switch delay 2 . . . the required downlink switch delay n}; and
  K2 is greater than or equal to the maximum value among the required switch delays for this uplink BWP in the active cell and all the passive cells, i.e.:
  K2 corresponds to a switch delay≥max {the required uplink switch delay 1, the required uplink switch delay 2 . . . the required uplink switch delay n}.

In an embodiment, the serving node includes 3 cells, and for downlink BWP switching, the UE capability corresponds to a UE of the first type, and cell 1 is an active cell. If the subcarrier spacing type μ=1 in cell 1, the subcarrier spacing type μ=2 in cell 2, and the subcarrier spacing type μ=3 in cell 3, referring to Table 1, the UE requires 2 slots for the BWP switching in cell 1, and the required switch delay is 0.5 ms*2=1 ms; the UE requires 3 slots for the BWP switching in cell 2, and the required switch delay is 0.25 ms*3=0.75 ms; and the UE requires 6 slots for the BWP switching in cell 3, and the required switch delay is 0.125 ms*6=0.75 ms. Then, the maximum value of the required switch delays is 1 ms. The switch delay corresponding to K0 for the active cell needs to be greater than or equal to 0.75 ms. Referring to Table 1, for the UE, in cell 1 (active cell), μ=1, and when K0=1, the corresponding switch delay is 0.5 ms*2=1 ms, which is equal to the maximum value 1 ms. Thus, K0 may be set to 1, or may be set to an integer greater than 1. For the UE, in cell 2 (passive cell), μ=2, and when K0'=4, the corresponding switch delay is 0.25 ms*4=1 ms, which is equal to the maximum value 1 ms. Thus, K0' for cell 2 should be set to at least 4, or may be set to an integer greater than 4. For the UE, in cell 3 (passive cell), μ=3, and when K0"=4, the corresponding switch delay is 0.125 ms*8=1 ms, which is equal to the maximum value 1 ms. Thus, K0" for cell 3 should be set to at least 8, or may be set to an integer greater than 8.

In an embodiment, the step of determining switch slot offsets of bandwidth part switching process for respective cells in the serving node includes: determining a user terminal type according to capabilities of the user terminal, the user terminal type including a first type and a second type; calculating the required switch delays for the user terminal type corresponding to respective subcarrier spacing types, and determining, according to a maximum value of the required switch delays, the respective switch slot offsets.

In an embodiment, for cells 1 to n, cell 1 is an active cell, the BWP switching in cell 1 triggers the BWP switching in cells 2 to n, and thus cells 2 to n are passive cells. Firstly, a UE type is determined according to the capability reported by the UE. The UE type includes the first type and the second type shown in Table 1. The required switch delays for the user terminal type corresponding to respective subcarrier spacing types are calculated based on Table 1, and the respective switch slot offsets are determined according to a maximum value of the required switch delays, obtaining the required switch delay 1, the required switch delay 2 . . . the required switch delay m; and the respective switch slot offsets are determined according to the maximum value max {the required switch delay 1, the required switch delay 2 . . . the required switch delay m} among the required switch delays for respective subcarrier spacing types, where m is the number of subcarrier spacing types and is a positive integer.

In an embodiment, K0 and K2 for the active cell in the switching indication information satisfy the conditions that:
K0 corresponds to a switch delay greater than or equal to the maximum value of the required switch delays for downlink BWP by the UE capability (or the UE type) in respective subcarrier spacing types:
K0 corresponds to a switch delay≥max {the required downlink switch delay 1, the required downlink switch delay 2 . . . the required downlink switch delay n}; and
K2 corresponds to a switch delay greater than or equal to the maximum value of the required switch delays for uplink BWP by the UE capability (or the UE type) in respective subcarrier spacing types:
K2 corresponds to a switch delay≥max {the required uplink switch delay 1, the required uplink switch delay 2 . . . the required uplink switch delay n}.

For example, when the UE type that corresponds to a UE capacity reported by the UE is Type 1, according to Table 1, the required switch delays of the Type 1 UE in respective subcarrier spacing types are 1 ms*1=1 ms, 0.5 ms*2=1 ms, 0.25 ms*3=0.75 ms, and 0.125 ms*6=0.75 ms, and the maximum value of the required switch delays of the Type 1 UE in the respective subcarrier spacing types is 1 ms, so for the Type 1 UE, K0 corresponds to a switch delay greater than or equal to 1 ms, and K2 corresponds to a switch delay greater than or equal to 1 ms. Similarly, when the UE type that corresponds to a UE capacity reported by the UE is Type 2, according to Table 1, the required switch delays of the Type 2 UE in respective subcarrier spacing types are 1 ms*3=3 ms, 0.5 ms*5=2.5 ms, 0.25 ms*9=2.25 ms, and 0.125 ms*17=2.125 ms. The maximum value of the required switch delays of the Type 2 UE in the respective subcarrier spacing types is 3 ms, so for the Type 2 UE, K0 corresponds to a switch delay greater than or equal to 3 ms, and K2 corresponds to a switch delay greater than or equal to 3 ms.

In an embodiment, the step of determining the respective switch slot offsets according to the maximum value of the required switch delays includes: searching, according to the maximum value, for the required switch slot offset for the user terminal in the active cell; determining an integer greater than or equal to the required switch slot offset as the switch slot offset of the active cell; and converting the switch slot offset of the active cell to obtain the switch slot offset of the passive cell.

For example, assuming that the UE type is the first type, cell 1 is an active cell, the subcarrier spacing type µ=1 in cell 1, and the maximum value is 1 ms. According to the maximum value, the required switch slot offset for that UE in cell 1 may be searched out with reference to Table 1, where the required switch slot offset is obtained by dividing the maximum value by a slot length corresponding to cell 1, i.e., 1 ms÷0.5 ms=2, then the searching result lies in that the required switch slot offset is 2. Then for downlink BWP switching, K0 for cell 1 is set to an integer greater than or equal to 2, e.g., K0=3. Then, the switch slot offset of the passive cell may be obtained by converting according to K0=3.

The switch slot offsets in this embodiment need to be converted for application in different cells. For example, if cell 1 is an active cell and the subcarrier spacing of a target BWP thereof is 15 KHz, cell 2 is a passive cell and the subcarrier spacing of a target BWP thereof is 30 KHz, the slot for PDSCH reception on cell 1 is the switch slot offset indicated by K0, the slot for PUSCH reception on cell 1 is the switch slot offset indicated by K2, and K0' and K2' on cell 2 need to be determined through conversion, so as to determine the slot for blind detection of the physical downlink control channel (PDCCH) on cell 2.

In an embodiment, the switch slot offsets of the two cells satisfy the following conversion relationship: $K0'=2^{\mu_1}/2^{\mu_2}*K0$. In this embodiment, K0 is the downlink BWP switch slot offset of cell 1, K0' is the downlink BWP switch slot offset of cell 2, $\mu_1$ is the subcarrier spacing type of cell 1, and $\mu_2$ is the subcarrier spacing type of cell 2.

In this embodiment, the switch delay for each switch slot offset in the corresponding cell is greater than or equal to the maximum value.

By determining, according to a maximum value of the required switch delays, the respective switch slot offsets, this embodiment considers not only the required switch delay for the active cell, but also the required switch delay for each passive cell in the process of indicating K0 and K2 for BWP switching on the active cell, thereby ensuring that the switch delay for each switch slot offset in the corresponding cell is greater than or equal to the maximum value, preserving sufficient time for the UE performing BWP switching, and improving reliability and communication quality of the BWP switching.

In an embodiment, the step of determining switch slot offsets of bandwidth part switching process for respective cells in the serving node includes: searching, according to a subcarrier spacing type in the active cell and a user terminal type, for the required switch slot offset for the user terminal in the active cell; determining an integer greater than or equal to the required switch slot offset as the switch slot offset of the active cell; and determining the switch slot offset of the passive cell from the switch slot offset of the active cell.

In this embodiment, the corresponding required switch delay on an active cell is searched according to a BWP switching scenario of the active cell, an integer greater than or equal to the required switch slot offset for the active cell is determined as the switch slot offset of the active cell, and the switch slot offset of the passive cell is determined from the switch slot offset of the active cell. K0 or K2 for the BWP switching on the active cell satisfies the conditions that: K0 corresponds to a switch delay the required switch delay for downlink BWP on the active cell; and K2 corresponds to a switch delay the required switch delay for uplink BWP on the active cell.

In an embodiment, the step of determining the switch slot offset of the passive cell from the switch slot offset of the active cell includes: taking a sum of the switch slot offset of the active cell and a first preset offset as the number of reference slots of the passive cell, the first preset offset being an integer; and converting the number of reference slots to obtain the switch slot offset of the passive cell.

In this embodiment, a sum of the switch slot offset of the active cell and a first preset offset offset1 is taken as the number of reference slots of the passive cell, and the number of reference slots is converted to obtain the switch slot offset of the passive cell. The first preset offset represents a difference in the number of switch slot offsets between the active cell and the passive cell. For example, for downlink BWP switching, if the active cell has a switch slot offset K0 and a subcarrier spacing type $\mu_1$, and the passive cell has a switch slot offset K0' and a subcarrier spacing type $\mu_2$, then $$K0' = \frac{2^{\mu_1}}{2^{\mu_2}} * K0 + \text{offset 1};$$

and for uplink BWP switching, if the active cell has a switch slot offset K2 and the passive cell has a switch slot offset K2', then $$K2' = \frac{2^{\mu_1}}{2^{\mu_2}} * K2 + \text{offset 1}.$$

In an embodiment, the first preset offset is determined according to at least one of first information and second information, the first information is pre-configured information for radio resource control, and the second information is preset bit field information for reinterpretation of switching indication information. Offset1 may be pre-configured by an RRC messages or may be determined by reinterpreting a bit field part in the BWP switching indication information. The bit field part is, for example, a frequency domain resource assignment field, or a time domain resource assignment field, or a carrier indicator field, etc. Taking 3 bits (A1A2A3) of the carrier indicator field as an example, at most 8 first preset offsets offset1 can be indicated. Table 3 is a look-up table of the first preset offsets and the 3 bits of the carrier indicator field.

TABLE 3

| First preset offsets vs. 3 bits of carrier indicator field | |
|---|---|
| A1A2A3 | Offset1 |
| 000 | −6 |
| 001 | −4 |
| 010 | −2 |
| 011 | 0 |
| 100 | 1 |
| 101 | 2 |
| 110 | 4 |
| 111 | 6 |

In an embodiment, the step of determining the switch slot offset of the passive cell from the switch slot offset of the active cell includes:
taking the switch slot offset of the active cell as the number of reference slots of the passive cell; and
taking a sum of the number of slots converted from the number of reference slots and a first preset offset as the switch slot offset of the passive cell, the first preset offset being an integer.

In this embodiment, the switch slot offset of the active cell is taken as the number of reference slots of the passive cell, and the number of reference slots is added by the first preset offset offset1 and then converted to obtain the switch slot offset of the passive cell. For example, for downlink BWP switching, if the active cell has a switch slot offset K0 and a subcarrier spacing type $\mu_1$, and the passive cell has a switch slot offset K0' and a subcarrier spacing type $\mu_2$, then $$K0' = \frac{2^{\mu_1}}{2^{\mu_2}} * K0 + \text{offset 1};$$

and for uplink BWP switching, if the active cell has a switch slot offset K2 and the passive cell has a switch slot offset K2', then $$K2' = \frac{2^{\mu_1}}{2^{\mu_2}} * K2 + \text{offset 1}.$$

In an embodiment, the first preset offset is determined according to at least one of first information and second information, the first information is pre-configured information for radio resource control, and the second information is preset bit field information for reinterpretation of switching indication information. Offset1 may be pre-configured by an RRC messages or may be determined by reinterpreting a bit field part in the BWP switching indication information. The bit field part is, for example, a frequency domain resource assignment field, or a time domain resource assignment field, or a carrier indicator field, etc.

In an embodiment, the serving node sends to the UE the switching indication information that indicates the switch slot offset of the active cell to each cell, in which case, the UE determines the switch slot offset of each cell according to the received switch slot offset of the active cell.

In an embodiment, the step of sending switching indication information to the user terminal includes: sending the switching indication information to the user terminal through downlink control information; and the switch slot offset includes a first switch slot offset or a second switch slot offset. The first switch slot offset is a switch slot offset of an uplink bandwidth part, and the second switch slot offset is a switch slot offset of a downlink bandwidth part.

In an embodiment, the active cell and the passive cell are in a bandwidth part bundle switching relationship, the active cell is a primary cell (PrimaryCell, PCell) or a secondary cell (SecondaryCell, SCell), and the passive cell is a secondary cell. The PCell and the SCell are defined in a carrier aggregation (CA) scenario.

In an embodiment, the switch slot offset of the passive cell is used for PDCCH transceiving.

The BWP switching process in the present embodiment is based on BWP bundle switching of an active cell and a passive cell, in which the BWP switching of the active cell triggers the BWP switching of the passive cell.

In an embodiment, a base station sends a downlink control information (DCI) message including switching indication information to a UE. The switching indication information is configured to schedule cells in a cross-carrier manner to indicate that BWP switching occurs on a passive cell SCell, or perform active cell BWP bundle to indicate that BWP switching occurs on the SCell, or perform SCell self-scheduling to indicate that BWP switching occurs on the SCell.

In an embodiment, the switching indication information is configured to trigger a reference signal.

In an embodiment, the switching indication information is configured to trigger reference signal measurement.

In an embodiment, the reference signal may be an aperiodic channel state information reference signal (A-CSI-RS).

In an embodiment, the reference signal may be a semi-persistent channel state information reference signal (SP-CSI-RS).

In an embodiment, the reference signal may be an aperiodic tracking reference signal (A-TRS).

In an embodiment, the reference signal may be a semi-persistent tracking reference signal (SP-TRS).

In an embodiment, the downlink control information (DCI) is BWP switching DCI, carries a BWP switching command and triggers a reference signal operation.

In an embodiment, switching a cell from dormant BWP to active BWP triggers a reference signal operation by default.

In an embodiment, the reference signal measurement refers to channel state information measurement, including channel measurement and interference measurement, and further including calculating a channel state information (CSI) parameter based on the measurement result. The CSI parameter includes a CSI-RS resource indicator (CRI), a rank indication (RI), a precoding matrix indicator (PMI), a channel quality indication (CQI), and the like. For example, reference signal measurement may refer to performing channel state information measurement based on an aperiodic channel state information reference signal.

In an embodiment, the reference signal measurement report means that the UE feeds back a reference signal measurement result CSI to the base station.

In an embodiment, the switching indication information is further configured to trigger a reference signal operation. The reference signal operation includes at least one of a reference signal, reference signal measurement and reference signal measurement report, the reference signal being a channel state information reference signal.

In an embodiment, the switching indication information is further configured to trigger the reference signal operation under a preset condition.

In an embodiment, the preset condition includes at least one of: a report quantity of higher-layer parameters set to none; tracking reference signal information of higher-layer parameters set to true; and repetition enable of higher-layer parameters set to on.

In an embodiment, the downlink-granted DCI triggers at least one reference signal operation in the case where a report quantity of higher-layer parameters is set to none, or tracking reference signal information (Trs-Info) of higher-layer parameters is set to true, or repetition enable of higher-layer parameters is set to on.

In an embodiment, the switching indication information is further configured to trigger a reference signal operation. The reference signal operation includes at least one of a reference signal and reference signal measurement, the reference signal being a sounding reference signal.

In an embodiment, the switching indication information is downlink-granted downlink control information. For example, a DCI format 1-1 is used for DL grant, i.e., triggering a reference signal operation by DL granted DCI.

In an embodiment, a time domain position for triggering the reference signal operation is the first available slot after the bandwidth part switching.

In an embodiment, a time domain position for triggering the reference signal operation is the first available slot after BWP switching. For example, the default is the first available slot after SCell BWP switching.

In an embodiment, SCell 1 is subjected to BWP switching through cross-carrier scheduling of Pcell or SCell 2, and the UE performs blind detection of the control message and obtains a downlink switch slot offset k0 or an uplink switch slot offset k2 based on a time domain resource assignment field look-up table. If the UE receives DCI at slot n, then the slot corresponding to n+k0 or n+k2 is the first available slot after the SCell 1 BWP switching, where n+k0 corresponds to downlink, and n+k2 corresponds to uplink.

In an embodiment, for example, SCell is subjected to BWP switching through SCell self-scheduling, and the UE performs blind detection of the control message and obtains a downlink switch slot offset k0 or an uplink switch slot offset k2 based on a time domain resource assignment field look-up table. If the UE receives DCI at slot n, then the slot corresponding to n+k0 or n+k2 is the first available slot after the Scell BWP switching, where n+k0 corresponds to downlink, and n+k2 corresponds to uplink.

In an embodiment, SCell is subjected to BWP switching through BWP bundle of PCell, and the UE performs blind detection of the control message and obtains a downlink switch slot offset k0 or an uplink switch slot offset K2 based on a time domain resource assignment field look-up table. If the UE receives DCI at slot n, then the slot corresponding to n+k0 or n+k2 is the first available slot after the PCell BWP switching.

In an embodiment, the time domain position triggering the reference signal operation defaults to the first available slot after BWP switching. The default first available slot after BWP switching may be determined according to the method for determining the switch slot offsets described in the above embodiments. For example, the UE determines k0' or k2' of the passive cell SCell. If the UE receives DCI at slot n, then the slot corresponding to n+k0' or n+k2' is the first available slot after the Scell BWP switching.

Figure 4:
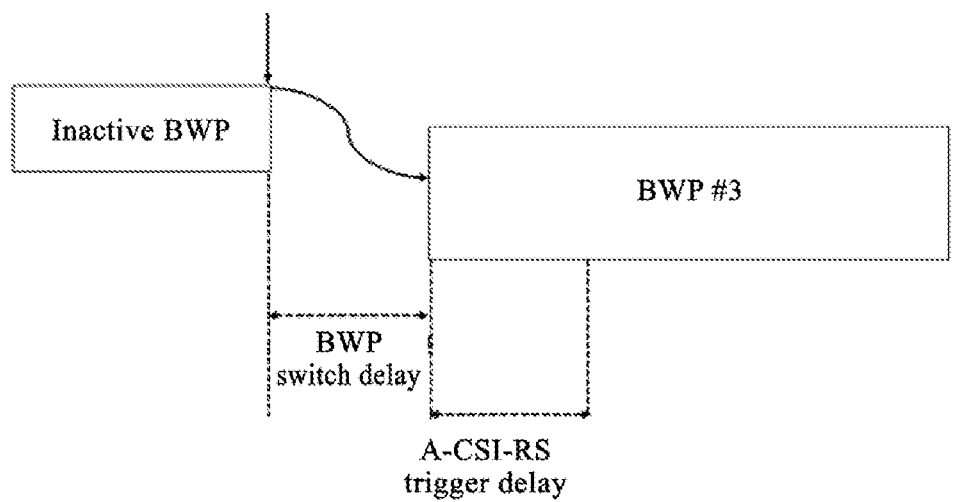
FIG. 4 is a schematic diagram illustrating A-CSI-RS triggering according to an embodiment.

FIG. 4 is a schematic diagram illustrating A-CSI-RS triggering according to an embodiment, which corresponds to the case where a delay for A-CSI-RS triggering is 0.

In an embodiment, in the case where the triggering corresponds to a time domain position defaulting to the first available slot after BWP switching, the first available slot after BWP switching is defaulted regardless of the configured value of aperiodic triggering offset for the higher-layer parameters.

In an embodiment, in the case where the triggering corresponds to a time domain position defaulting to the first available slot after BWP switching, it means that the aperiodic triggering offset for the higher-layer parameter a is set to 0.

In an embodiment, a time domain position for triggering the reference signal operation is a slot corresponding to a sum of the first available slot after the bandwidth part switching and a second preset offset, the second preset offset being an integer.

In an embodiment, the second preset offset is determined according to at least one of first information and second information, the first information is pre-configured information for radio resource control, and the second information is preset bit field information for reinterpretation of switching indication information.

In an embodiment, a time domain position for triggering the reference signal operation may be a slot corresponding to a sum of the first available slot after BWP switching and a second preset offset. The second preset offset represents a difference in the number of slots between the first available slot after BWP switching and the time domain position for triggering the reference signal operation. For example, if the first available slot after SCell BWP switching is m, and the second preset offset is k, then the time domain position for triggering the reference signal is slot m+k. In this embodiment, the second preset offset corresponds to a case where the A-CSI-RS trigger delay is not 0, as shown in FIG. 4.

In an embodiment, the second preset offset is RRC pre-configured, and is an integer. For example, the preset offset is pre-configured through an RRC message to 2, and assuming that the first available slot after Scell BWP switching is m, then the base station sends the reference signal at slot m+2, and the UE performs correlation measurement at slot m+2.

In an embodiment, the second preset offset is obtained by reinterpreting a bit field part in the switching indication information, and the second preset offset is an integer. Obtaining by reinterpreting a bit field part in the switching indication information means indicating through part or all of the bits in the bit field part of the switching indication information, for example, indicating the time domain position for triggering through information of a carrier indicator field (CIF), or indicating the time domain position for triggering through information of a frequency domain resource assignment field, or indicating the time domain position for triggering through information of a time domain resource assignment field, or indicating the time domain position for triggering through information of a preset bit field already present in the DCI message. For example, 3 bits (A1A2A3) of the carrier indicator field may be used to indicate at most 8 values, or MSB3 bits (A1A2A3) of the time domain resource assignment field are used, or MSB3 bits (A1A2A3) of the frequency domain resource assignment field are used. Table 4 is a look-up table of the second preset offsets and the 3 bits of a present bit field.

TABLE 4

Second preset offsets vs. 3 bits of preset bit field

| A1A2A3 | Offset2 |
|---|---|
| 000 | 0 |
| 001 | 1 |
| 010 | 2 |
| 011 | 3 |
| 100 | 4 |
| 101 | 5 |
| 110 | 6 |
| 111 | 7 |

In an embodiment, for a frequency range 2 (FR2), a time domain position for triggering the reference signal operation is obtained by adding a third preset offset to an original CSI-RS scheduling offset to a new CSI-RS scheduling offset Y+d+offset3, where Y represents the threshold beamSwitch-Timing reported by UE. If the subcarrier spacing of the PDCCH is equal to the subcarrier spacing of the CSI-RS, then d=0. If the subcarrier spacing of the PDCCH is not equal to the subcarrier spacing of the CSI-RS, then $$d = 14 * \frac{2^{\mu_{CSIRS}}}{2^{\mu_{PDCCH}}}.$$

The third preset offset offset3 is obtained from the BWP switch delay.

In an embodiment, the time unit for the new CSI-RS scheduling offset Y+d+offset3 is symbol.

In an embodiment, a start symbol of the new CSI-RS scheduling offset Y+d+offset3 is a start position of the first symbol in the first available slot of BWP after switching.

In an embodiment, the start symbol of the new CSI-RS scheduling offset Y+d+offset3 may be an end position of the last symbol of the control channel in the first available slot of BWP after switching.

In an embodiment, the start symbol of the new CSI-RS scheduling offset Y+d+offset3 may be an end position of the last symbol of the control channel corresponding to the DCI switching.

In an embodiment, the reference signal refers to an aperiodic sounding reference signal (A-SRS).

In an embodiment, a trigger position of the aperiodic sounding reference signal is a slot corresponding to a sum of the first available slot after Scell BWP switching and a fourth preset offset.

In an embodiment, the fourth preset offset is RRC pre-configured, or is obtained by reinterpreting a bit field part in the switching indication information, and the fourth preset offset is an integer. The fourth preset offset represents a difference in the number of slots between the first available slot after Scell BWP switching and the trigger position of the aperiodic sounding reference signal. For example, the fourth preset offset is pre-configured through an RRC message to 3, and assuming that the first available slot after Scell BWP switching is n, then the UE sends the sounding reference signal at slot n+3, and the base stations performs correlation measurement at slot n+3.

In this embodiment, through the switching indication information in the downlink control information, indicating BWP switching and triggering the reference signal operation are performed at the same time, thereby accelerating channel tracking and channel measurement, reducing control channel overhead, and implementing the function of fast SCell activation.

Figure 5:
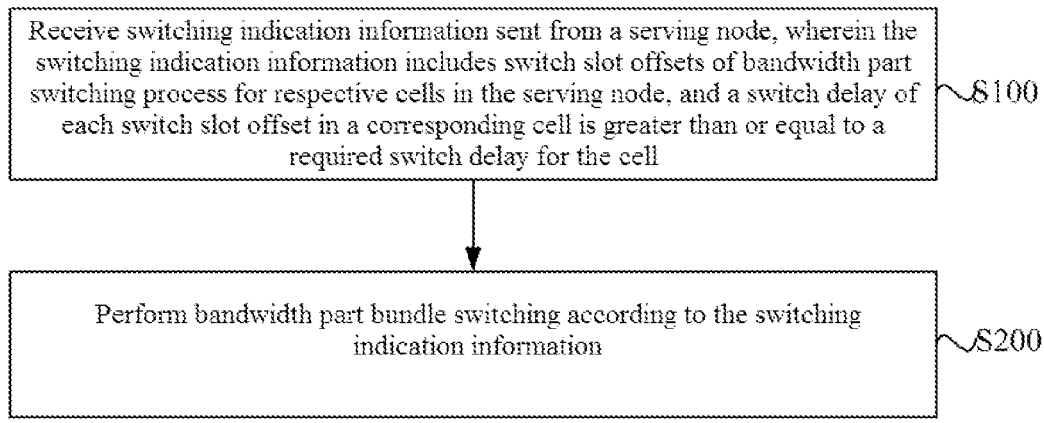
FIG. 5 is a flowchart of a bandwidth part switching method according to an embodiment.

FIG. 5 is a flowchart of a bandwidth part switching method according to an embodiment. As shown in FIG. 5, the method is applied to a user terminal and includes steps S100 and S200.

At step S100, receive switching indication information sent from a serving node. The switching indication information includes switch slot offsets of bandwidth part switching process for respective cells in the serving node, and a switch delay of each switch slot offset in a corresponding cell is greater than or equal to the required switch delay for the cell.

At step S200, perform bandwidth part bundle switching according to the switching indication information.

In an embodiment, the cell is an active cell or a passive cell, the active cell is a cell actively initiating bandwidth part switching in the serving node, and the passive cell is a cell passively initiating bandwidth part switching in the serving node.

In an embodiment, the serving node sends to the UE the switching indication information that indicates the switch slot offset of the active cell to each cell, in which case, the UE determines the switch slot offset of each cell according to the received switch slot offset of the active cell.

In an embodiment, before performing bandwidth part bundle switching according to the switching indication information, the method further includes:
determining the switch slot offset of the passive cell from the received switch slot offset of the active cell; and the step of determining the switch slot offset of the passive cell from the received switch slot offset of the active cell includes:
taking a sum of the switch slot offset of the active cell and a first preset offset as the number of reference slots of the passive cell, the first preset offset being an integer; and
converting the number of reference slots to obtain the switch slot offset of the passive cell.

In an embodiment, before performing bandwidth part bundle switching according to the switching indication information, the method further includes:
determining the switch slot offset of the passive cell from the received switch slot offset of the active cell; and
the step of determining the switch slot offset of the passive cell from the received switch slot offset of the active cell includes:
taking the switch slot offset of the active cell as the number of reference slots of the passive cell; and
taking a sum of the number of slots converted from the number of reference slots and a first preset offset as the switch slot offset of the passive cell, the first preset offset being an integer.

In an embodiment, the first preset offset is determined according to at least one of first information and second information, the first information is pre-configured information for radio resource control, and the second information is preset bit field information for reinterpretation of switching indication information.

In an embodiment, the method further includes:
executing a reference signal operation in a target slot according to the switching indication information, the target slot being the first available slot after the bandwidth part switching; or,
executing a reference signal operation in a target slot according to the switching indication information, the target slot being a slot corresponding to a sum of the first available slot after the bandwidth part switching and a second preset offset, and the second preset offset being an integer.

In an embodiment, the second preset offset is determined according to at least one of first information and second information, the first information is pre-configured information for radio resource control, and the second information is preset bit field information for reinterpretation of switching indication information.

In an embodiment, the reference signal operation includes at least one of execution of a reference signal, execution of reference signal measurement and execution of reference signal measurement report, the reference signal being a channel state information reference signal.

In an embodiment, the reference signal operation includes executing the reference signal operation under a preset condition; and the preset condition includes one of: a report quantity of higher-layer parameters set to none; tracking reference signal information of higher-layer parameters set to true; and repetition enable of higher-layer parameters set to on.

In an embodiment, the reference signal operation includes at least one of execution of a reference signal and execution of reference signal measurement.

Figure 6:
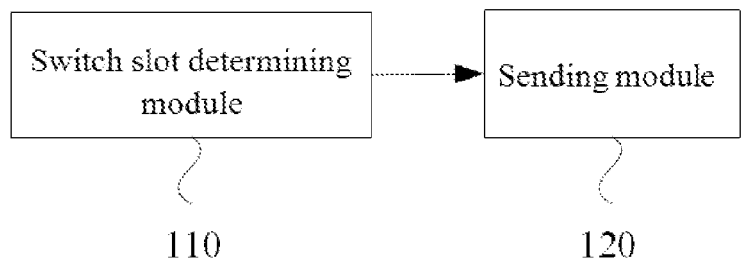
FIG. 6 is a schematic structural diagram of a bandwidth part switching apparatus according to an embodiment.

An embodiment of the present disclosure further provides a bandwidth part switching apparatus. FIG. 6 is a schematic structural diagram of a bandwidth part switching apparatus according to an embodiment. As shown in FIG. 6, the apparatus includes:

a switch slot determining module 110 configured to determine switch slot offsets of bandwidth part switching process for respective cells in a serving node, a switch delay of each switch slot offset in a corresponding cell being greater than or equal to the required switch delay for the cell; and
a sending module 120 configured to send switching indication information to a user terminal, the switching indication information including the respective switch slot offsets.

In an embodiment, the cell is an active cell or a passive cell, the active cell is a cell actively initiating bandwidth part switching in the serving node, and the passive cell is a cell passively initiating bandwidth part switching in the serving node.

In an embodiment, the switch slot determining module 110 is specifically configured to:
calculate, according to a subcarrier spacing type in each cell and a user terminal type, the required switch delays for the user terminal switching in the respective cells; and
determine, according to a maximum value of the required switch delays, the respective switch slot offsets.

In an embodiment, the switch slot determining module 110 is specifically configured to:
determine a user terminal type according to capabilities of the user terminal, the user terminal type including a first type and a second type;
calculate the required switch delays for the user terminal type corresponding to respective subcarrier spacing types, and
determine, according to a maximum value of the required switch delays, the respective switch slot offsets.

In an embodiment, determining the respective switch slot offsets according to the maximum value of the required switch delays includes:
searching, according to the maximum value, for the required switch slot offset for the user terminal in the active cell;
determining an integer greater than or equal to the required switch slot offset as the switch slot offset of the active cell; and
converting the switch slot offset of the active cell to obtain the switch slot offset of the passive cell.

In an embodiment, the switch delay for each switch slot offset in the corresponding cell is greater than or equal to the maximum value.

In an embodiment, the switch slot determining module 110 is specifically configured to:
search, according to a subcarrier spacing type in the active cell and a user terminal type, the required switch slot offset for the user terminal in the active cell;
determine an integer greater than or equal to the required switch slot offset as the switch slot offset of the active cell; and
determine the switch slot offset of the passive cell from the switch slot offset of the active cell.

In an embodiment, determining the switch slot offset of the passive cell from the switch slot offset of the active cell includes:
taking a sum of the switch slot offset of the active cell and a first preset offset as the number of reference slots of the passive cell, the first preset offset being an integer; and
converting the number of reference slots to obtain the switch slot offset of the passive cell.

In an embodiment, determining the switch slot offset of the passive cell from the switch slot offset of the active cell includes:
taking the switch slot offset of the active cell as the number of reference slots of the passive cell; and
taking a sum of the number of slots converted from the number of reference slots and a first preset offset as the switch slot offset of the passive cell, the first preset offset being an integer.

In an embodiment, the first preset offset is determined according to at least one of first information and second information, the first information is pre-configured information for radio resource control, and the second information is preset bit field information for reinterpretation of switching indication information.

In an embodiment, the sending module 120 is specifically configured to:
send the switching indication information to the user terminal through downlink control information.

The switch slot offset includes at least one of a first switch slot offset and a second switch slot offset, the first switch slot offset is a switch slot offset of an uplink bandwidth part, and the second switch slot offset is a switch slot offset of a downlink bandwidth part.

In an embodiment, the active cell and the passive cell are in a bandwidth part bundle switching relationship, the active cell is a primary cell or a secondary cell, and the passive cell is a secondary cell.

In an embodiment, the switching indication information is further configured to trigger a reference signal operation. The reference signal operation includes at least one of a reference signal, reference signal measurement and reference signal measurement report, the reference signal being a channel state information reference signal.

In an embodiment, the switching indication information is further configured to trigger the reference signal operation under a preset condition. The preset condition includes at least one of: a report quantity of higher-layer parameters set to none; tracking reference signal information of higher-layer parameters set to true; and repetition enable of higher-layer parameters set to on.

In an embodiment, the switching indication information is further configured to trigger a reference signal operation. The reference signal operation includes at least one of a reference signal and reference signal measurement, the reference signal being a sounding reference signal.

In an embodiment, the switching indication information is downlink-granted downlink control information.

In an embodiment, a time domain position for triggering the reference signal operation is the first available slot after the bandwidth part switching.

In an embodiment, a time domain position for triggering the reference signal operation is a slot corresponding to a sum of the first available slot after the bandwidth part switching and a second preset offset, the second preset offset being an integer.

In an embodiment, the second preset offset is determined according to at least one of first information and second information, the first information is pre-configured information for radio resource control, and the second information is preset bit field information for reinterpretation of switching indication information.

In an embodiment, the apparatus further includes:
a reference signal sending module configured to send a reference signal to the user terminal.

Figure 7:
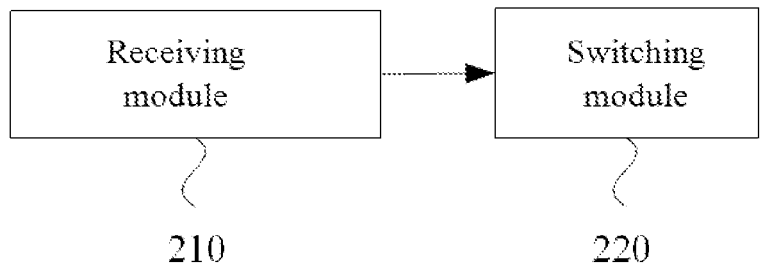
FIG. 7 is a schematic structural diagram of a bandwidth part switching apparatus according to an embodiment.

An embodiment of the present disclosure further provides a bandwidth part switching apparatus. FIG. 7 is a schematic structural diagram of a bandwidth part switching apparatus according to an embodiment. As shown in FIG. 7, the apparatus includes:
a receiving module 210 configured to receive switching indication information sent from a serving node, the switching indication information including switch slot offsets of bandwidth part switching process for respective cells in the serving node, and a switch delay of each switch slot offset in a corresponding cell is greater than or equal to the required switch delay for the cell; and
a switching module 220 configured to perform bandwidth part bundle switching according to the switching indication information.

In an embodiment, the cell is an active cell or a passive cell, the active cell is a cell actively initiating bandwidth part switching in the serving node, and the passive cell is a cell passively initiating bandwidth part switching in the serving node.

In an embodiment, the apparatus further includes a processing module configured to:
determine, before performing bandwidth part bundle switching according to the switching indication information, the switch slot offset of the passive cell from the received switch slot offset of the active cell.

Determining the switch slot offset of the passive cell from the received switch slot offset of the active cell includes:
taking a sum of the switch slot offset of the active cell and a first preset offset as the number of reference slots of the passive cell, the first preset offset being an integer; and
converting the number of reference slots to obtain the switch slot offset of the passive cell.

In an embodiment, the processing module is specifically configured to:
determine the switch slot offset of the passive cell from the received switch slot offset of the active cell.

Determining the switch slot offset of the passive cell from the received switch slot offset of the active cell includes:
taking the switch slot offset of the active cell as the number of reference slots of the passive cell; and
taking a sum of the number of slots converted from the number of reference slots and a second preset offset as the switch slot offset of the passive cell, the second preset offset being an integer.

In an embodiment, the apparatus further includes an execution module configured to:
execute a reference signal operation in a target slot according to the switching indication information, the target slot being the first available slot after the bandwidth part switching; or,
execute a reference signal operation in a target slot according to the switching indication information, the target slot being a slot corresponding to a sum of the first available slot after the bandwidth part switching and a third preset offset, the third preset offset being an integer.

In an embodiment, the reference signal operation includes at least one of execution of a reference signal, execution of reference signal measurement and execution of reference signal measurement report, the reference signal being a channel state information reference signal.

In an embodiment, the reference signal operation includes executing the reference signal operation under a preset condition; and the preset condition includes one of: a report quantity of higher-layer parameters set to none; tracking reference signal information of higher-layer parameters set to true; and repetition enable of higher-layer parameters set to on.

In an embodiment, the reference signal operation includes at least one of execution of a reference signal and execution of reference signal measurement, the reference signal being a sounding reference signal.

In an embodiment, the apparatus further includes:
a measuring module configured to measure the reference signal sent from the serving node.

In an embodiment, the measurement includes performing time-frequency synchronization on the reference signals sent from the serving node, or measuring the channel state information.

In an embodiment, the apparatus further includes:
a reporting module configured to report a reference signal measurement result to the serving node.

An embodiment of the present disclosure further provides a method for realizing fast activation of a Scell. The method includes: sending a DCI message to a UE from a base station, The DCI message including a switching indication information and is configured to schedule cells in a cross-carrier manner to indicate that BWP switching occurs on an Scell, or perform active cell BWP bundle to indicate that BWP switching occurs on the Scell, or perform SCell self-scheduling to indicate that BWP switching occurs on the SCell.

In an embodiment, the DCI message is further configured to trigger a reference signal.

In an embodiment, the DCI message is further configured to trigger reference signal measurement.

In an embodiment, the DCI message is further configured to trigger reference signal measurement report.

In an embodiment, the DCI message carries a BWP switching command and a trigger reference signal command at the same time.

In an embodiment, the DCI message carries a BWP switching command and a trigger reference signal measurement command at the same time.

In an embodiment, the DCI message carries a BWP switching command and a trigger reference signal measurement report command at the same time.

In an embodiment, the reference signal may be an aperiodic channel state information reference signal (A-CSI-RS).

In an embodiment, the reference signal may be a semi-persistent channel state information reference signal (SP-CSI-RS).

In an embodiment, the reference signal may be an aperiodic tracking reference signal (A-TRS).

In an embodiment, the reference signal may be a semi-persistent tracking reference signal (SP-TRS).

In an embodiment, the reference signal measurement refers to channel state information measurement, including channel measurement and interference measurement, while calculating CSI parameters such as CRI/RI/PMI/CQI based on the measurement result, for example, performing channel state information measurement based on an aperiodic channel state information reference signal.

In an embodiment, the reference signal measurement report means that the terminal feeds back CSI to the base station.

In an embodiment, the switching indication information may be downlink-granted DCI.

In an embodiment, the downlink-granted DCI may trigger CSI-RS and/or CSI-RS measurement only when a report quantity of higher-layer parameters is set to none or Trs-Info or repetition of higher-layer parameters is enabled.

In an embodiment, the time domain position for triggering the reference signal is the first available slot after BWP switching.

In an embodiment, a time domain position for triggering the reference signal is a slot corresponding to a sum of the first available slot after BWP switching and a second preset offset.

In an embodiment, the second preset offset is RRC pre-configured or is obtained by reinterpreting a bit field part in the switching indication information, and the second preset offset is an integer.

In an embodiment, the second preset offset is indicated by preset bit field information of the bit field part in the switching indication information.

In this embodiment, completing BWP switching and triggering the reference signal operation are performed at the same time via the same DCI, thereby accelerating channel tracking and channel measurement, reducing control channel overhead, and implementing the function of fast SCell activation.

An embodiment of the present disclosure further provides a serving node. The bandwidth part switching method applied to the serving node in the foregoing embodiments may be executed by a bandwidth part switching apparatus, and the bandwidth part switching apparatus may be implemented by software and/or hardware and integrated in the serving node.

Figure 8:
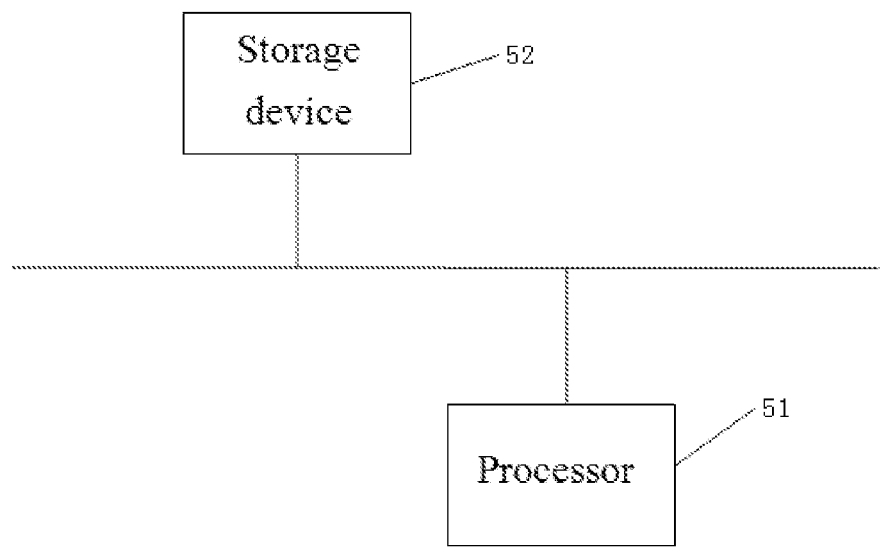
FIG. 8 is a schematic structural diagram of a serving node according to an embodiment.

FIG. 8 is a schematic structural diagram of a serving node according to an embodiment. As shown in FIG. 8, the serving node provided in this embodiment includes: a processor 51 and a storage device 52. One or more processors may be provided in the serving node, and FIG. 8 takes a serving node 51 as an example. The processor 51 and the storage device 52 in the serving node may be connected via a bus or by other means, and FIG. 8 illustrates the connection via a bus as an example.

The one or more programs are executed by the one or more processors 51 so that the one or more processors implement the bandwidth part switching method applied to the serving node according to any of the above embodiments.

As a computer-readable storage medium, the storage device 52 in the serving node may be configured to store one or more programs which may be software programs, computer-executable programs, and modules, such as the program instructions/modules corresponding to the bandwidth part switching method in the embodiments of the present disclosure (for example, the modules in the bandwidth part switching apparatus shown in FIG. 6, including: a switch slot determining module 110 and a sending module 120). The processor 51 executes the software programs, instructions and modules stored in the storage device 52 to perform various functional applications and data processing of the apparatus, i.e., implements the bandwidth part switching method applied to the serving node described in any of the above embodiments.

The storage device 52 mainly includes a program storage area and a data storage area. The program storage area may store an operating system, or an application program required for at least one function; and the data storage area may store data created according to the use of the apparatus, and the like. Further, the storage device 52 may include a high speed random access memory, and may further include a non-volatile memory, such as at least one magnetic disk memory device, flash memory apparatus, or other non-volatile solid state memory devices. In some examples, the storage device 52 may include a memory remotely disposed relative to the processor 51, which may be connected to the apparatus via a network. Examples of such networks include, but are not limited to, the Internet, intranets, local area networks, mobile communication networks, and combinations thereof.

Further, when executed by the one or more processors 51, the one or more programs contained in the serving node cause the bandwidth part switching method applied to the serving node described in any of the above embodiments to be implemented.

Technical details of the serving node proposed in this embodiment that are not described may refer to any of the above embodiments, and this embodiment has the same beneficial effects as performing the bandwidth part switching method applied to the serving node.

An embodiment of the present disclosure further provides a user terminal. The bandwidth part switching method applied to the user terminal in the foregoing embodiments may be executed by a bandwidth part switching apparatus, and the bandwidth part switching apparatus may be implemented by software and/or hardware and integrated in the user terminal.

Figure 9:
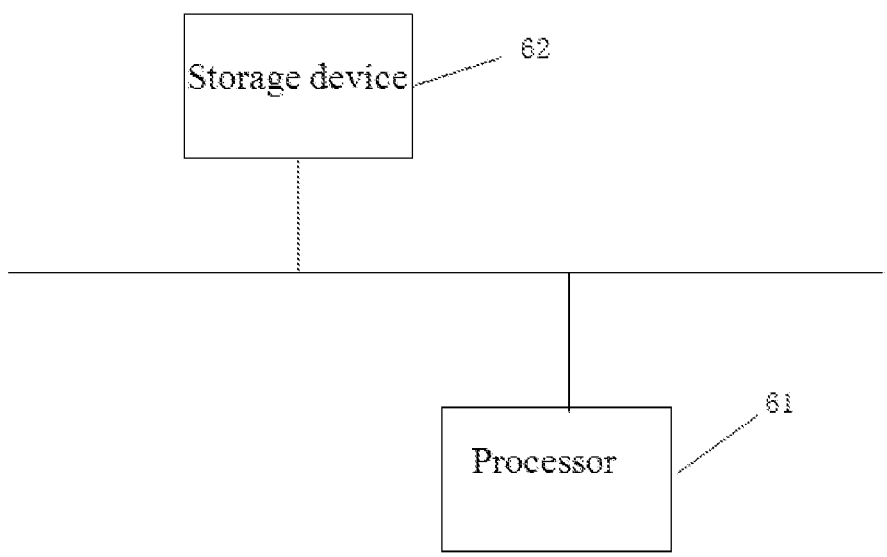
FIG. 9 is a schematic structural diagram of a user terminal according to an embodiment.

FIG. 9 is a schematic structural diagram of a user terminal according to an embodiment. As shown in FIG. 9, the user terminal provided in this embodiment includes: a processor 61 and a storage device 62. One or more processors may be provided in the user terminal, and FIG. 9 takes a user terminal 61 as an example. The processor 61 and the storage device 62 in the user terminal may be connected via a bus or by other means, and FIG. 9 illustrates the connection via a bus as an example.

The one or more programs are executed by the one or more processors 61 so that the one or more processors implement the bandwidth part switching method applied to the user terminal according to any of the above embodiments.

As a computer-readable storage medium, the storage device 62 in the user terminal may be configured to store one or more programs which may be software programs, computer-executable programs, and modules, such as the program instructions/modules corresponding to the bandwidth part switching method in the embodiments of the present disclosure (for example, the modules in the bandwidth part switching apparatus shown in FIG. 7, including: a receiving module 210 and a switching module 220). The processor 61 executes the software programs, instructions and modules stored in the storage device 62 to perform various functional applications and data processing of the apparatus, i.e., implements the bandwidth part switching method applied to the user terminal described in any of the above embodiments.

The storage device 62 mainly includes a program storage area and a data storage area. The program storage area may store an operating system, or an application program required for at least one function; and the data storage area may store data created according to the use of the apparatus, and the like. Further, the storage device 62 may include a high speed random access memory, and may further include a non-volatile memory, such as at least one magnetic disk memory device, flash memory device, or other non-volatile solid state memory devices. In some examples, the storage device 62 may include a memory remotely disposed relative to the processor 61, which may be connected to the apparatus via a network. Examples of such networks include, but are not limited to, the Internet, intranets, local area networks, mobile communication networks, and combinations thereof.

Further, when executed by the one or more processors 61, the one or more programs contained in the user terminal cause the bandwidth part switching method applied to the user terminal described in any of the above embodiments to be implemented.

Technical details of the user terminal proposed in this embodiment that are not described may refer to any of the above embodiments, and this embodiment has the same beneficial effects as performing the bandwidth part switching method.

An embodiment of the present disclosure further provides a storage medium containing computer-executable instructions, which instructions are configured to, when executed by a computer processor, cause a bandwidth part switching method to be implemented.

In an embodiment, the method includes: determining switch slot offsets of bandwidth part switching process for respective cells in a serving node, wherein a switch delay of each switch slot offset in a corresponding cell being greater than or equal to the required switch delay for the cell; and sending switching indication information to a user terminal, the switching indication information including the respective switch slot offsets.

In an embodiment, the method includes: receiving switching indication information sent from a serving node, the switching indication information including switch slot offsets of bandwidth part switching process for respective cells in the serving node, and a switch delay of each switch slot offset in a corresponding cell being greater than or equal to the required switch delay for the cell; and performing bandwidth part bundle switching according to the switching indication information.

Through the description of the above implementations, those skilled in the art may understand that the present disclosure may be implemented by means of software and general hardware, or by hardware. Based on such understanding, the technical solution the present disclosure may be embodied in the form of software products. The computer software product may be stored in a computer readable storage medium, such as a computer floppy disk, a Read-Only Memory (ROM), a Random Access Memory (RAM), a Flash Memory (FLASH), a hard disk or an optical disk, and includes a plurality of instructions for causing a computer device (which may be a personal computer, a server, or a network device, etc.) to perform the method described in any of the embodiments of the present disclosure.

The above are only exemplary embodiments of the present disclosure and not intended to limit the scope of the present disclosure.

The block diagrams of any logic flows in the figures of this application may represent program steps, or may represent interconnected logic circuits, modules, and functions, or may represent a combination of program steps and logic circuits, modules, and functions. The computer program may be stored on a memory. The memory may be of any type suitable to the local technical environment and may be implemented using any suitable data storage technology, such as but not limited to, Read-Only memories (ROMs), Random Access Memories (RAMs), optical storage devices and systems (Digital Video disks (DVDs), Compact Discs (CDs)), etc. The computer-readable medium may include a non-transitory storage medium. The data processor may be of any type suitable to the local technical environment, such as but not limited to, general purpose computers, dedicated computers, microprocessors, Digital Signal Processors (DSPs), Application Specific Integrated Circuits (ASICs), Field-Programmable Gate Arrays (FGPAs), and processors based on a multi-core processor architecture.

What is claimed is:

1. A bandwidth part switching method, comprising:
   determining switch slot offsets of bandwidth part switching process for respective cells in a serving node, wherein the switch slot offset corresponding to each cell has a switch delay in the cell that is greater than or equal to a required switch delay for the cell; and
   sending switching indication information to a user terminal, wherein the switching indication information comprises the switch slot offsets corresponding to the respective cells,
   wherein the cell is an active cell or a passive cell, the active cell is a cell actively initiating bandwidth part switching in the serving node, and the passive cell is a cell passively initiating bandwidth part switching in the serving node; and
   wherein the step of determining the switch slot offsets of bandwidth part switching process for the respective cells in the serving node comprises:
   a. calculating, according to a subcarrier spacing type in each cell and a user terminal type, the required switch delays for the user terminal switching in the respective cells; and determining, according to a maximum value of at least one required switch delay, the switch slot offsets corresponding to the respective cells;
   b. determining a user terminal type according to capabilities of the user terminal, wherein the user terminal type comprises a first type and a second type; calculating the required switch delays for the user terminal type corresponding to respective subcarrier spacing types; and determining, according to a maximum value of at least one required switch delay, the switch slot offsets corresponding to the respective cells; or
   c. searching, according to a subcarrier spacing type in the active cell and a user terminal type, for the required switch slot offset for the user terminal in the active cell; determining an integer greater than or equal to the required switch slot offset as the switch slot offset of the active cell; and determining the switch slot offset of the passive cell from the switch slot offset of the active cell.

2. The method according to claim 1, wherein the step of determining, according to the maximum value of at least one required switch delay, the switch slot offsets corresponding to the respective cells comprises:
   searching, according to the maximum value, for the required switch slot offset for the user terminal in the active cell;
   determining an integer greater than or equal to the required switch slot offset as the switch slot offset of the active cell; and
   converting the switch slot offset of the active cell to obtain the switch slot offset of the passive cell,
   wherein the switch slot offset corresponding to each cell has a switch delay in the cell that is greater than or equal to the maximum value.

3. The method according to claim 1, wherein the step of determining the switch slot offset of the passive cell from the switch slot offset of the active cell comprises:
   taking a sum of the switch slot offset of the active cell and a first preset offset as the number of reference slots of the passive cell, the first preset offset being an integer; and converting the number of reference slots to obtain the switch slot offset of the passive cell, or
   taking the switch slot offset of the active cell as the number of reference slots of the passive cell; and taking a sum of the number of slots converted from the number of reference slots and a first preset offset as the switch slot offset of the passive cell, the first preset offset being an integer,
   wherein the first preset offset is determined according to at least one of first information and second information, the first information is pre-configured information for radio resource control, and the second information is preset bit field information for reinterpretation of switching indication information.

4. The method according to claim 1, wherein the step of sending switching indication information to the user terminal comprises:
   sending the switching indication information to the user terminal through downlink control information; and
   the switch slot offset comprises at least one of a first switch slot offset and a second switch slot offset, wherein the first switch slot offset is a switch slot offset of an uplink bandwidth part, and the second switch slot offset is a switch slot offset of a downlink bandwidth part.

5. The method according to claim 1, wherein the active cell and the passive cell are in a bandwidth part bundle switching relationship, the active cell is a primary cell or a secondary cell, and the passive cell is a secondary cell.

6. The method according to claim 1, wherein the switching indication information is further configured to trigger a reference signal operation, comprising at least one of a reference signal, reference signal measurement and reference signal measurement report, the reference signal being a channel state information reference signal or a sounding reference signal.

7. The method according to claim 6, wherein in case where the reference signal is a channel state information reference signal:
   the switching indication information is further configured to trigger the reference signal operation under a preset condition; and
   the preset condition comprises at least one of: a report quantity of higher-layer parameters set to none; tracking reference signal information of higher-layer parameters set to true; and repetition enable of higher-layer parameters set to on.

8. The method according to claim 6, wherein any one of the following is satisfied:
   a. the switching indication information is downlink-granted downlink control information;
   b. a time domain position for triggering the reference signal operation is the first available slot after the bandwidth part switching; and
   c. a time domain position for triggering the reference signal operation is a slot corresponding to a sum of the first available slot after the bandwidth part switching and a second preset offset, the second preset offset being an integer, wherein the second preset offset is determined according to at least one of first information and second information, the first information is pre-configured information for radio resource control, and the second information is preset bit field information for reinterpretation of switching indication information.

9. A serving node, comprising:
   one or more processors; and
   a storage device configured to store one or more programs; wherein the one or more programs are executed by the one or more processors so that the one or more processors implement the bandwidth part switching method according to claim 1.

10. A non-transitory storage medium having a computer program stored thereon, which computer program, when executed by a processor, causes the bandwidth part switching method according to claim 1 to be implemented.

11. A bandwidth part switching method, comprising:
receiving switching indication information sent from a serving node, wherein the switching indication information comprises switch slot offsets of bandwidth part switching process for respective cells in the serving node, and the switch slot offset corresponding to each cell has a switch delay in the cell that is greater than or equal to a required switch delay for the cell; and
performing bandwidth part bundle switching according to the switching indication information,
wherein the cell is an active cell or a passive cell, the active cell is a cell actively initiating bandwidth part switching in the serving node, and the passive cell is a cell passively initiating bandwidth part switching in the serving node;
wherein before performing bandwidth part bundle switching according to the switching indication information, the method further comprises: determining the switch slot offset of the passive cell from the received switch slot offset of the active cell; and
wherein the step of determining the switch slot offset of the passive cell from the received switch slot offset of the active cell comprises:
  a. taking a sum of the switch slot offset of the active cell and a first preset offset as the number of reference slots of the passive cell, the first preset offset being an integer; and converting the number of reference slots to obtain the switch slot offset of the passive cell; or,
  b. taking the switch slot offset of the active cell as the number of reference slots of the passive cell; and taking a sum of the number of slots converted from the number of reference slots and a first preset offset as the switch slot offset of the passive cell, the first preset offset being an integer.

12. The method according to claim 11, further comprising:
executing a reference signal operation in a target slot according to the switching indication information, wherein the target slot is the first available slot after the bandwidth part switching; or,
executing a reference signal operation in a target slot according to the switching indication information, wherein the target slot is a slot corresponding to a sum of the first available slot after the bandwidth part switching and a second preset offset, the second preset offset being an integer.

13. The method according to claim 12, wherein the reference signal operation comprises at least one of execution of a reference signal, execution of reference signal measurement and execution of reference signal measurement report, the reference signal being a channel state information reference signal or a sounding reference signal.

14. The method according to claim 13, wherein in case where the reference signal is a channel state information reference signal:
the reference signal operation comprises executing the reference signal operation under a preset condition; and
the preset condition comprises one of: a report quantity of higher-layer parameters set to none; tracking reference signal information of higher-layer parameters set to true; and repetition enable of higher-layer parameters set to on.

15. A terminal, comprising:
one or more processors; and
a storage device configured to store one or more programs; wherein
the one or more programs are executed by the one or more processors so that the one or more processors implement the bandwidth part switching method according to claim 11.

16. A bandwidth part switching apparatus, comprising:
a switch slot determining module configured to determine switch slot offsets of bandwidth part switching process for respective cells in a serving node, wherein the switch slot offset corresponding to each cell has a switch delay in the cell that is greater than or equal to a required switch delay for the cell; and
a sending module configured to send switching indication information to a user terminal, wherein the switching indication information comprises the switch slot offsets corresponding to the respective cells,
wherein the cell is an active cell or a passive cell, the active cell is a cell actively initiating bandwidth part switching in the serving node, and the passive cell is a cell passively initiating bandwidth part switching in the serving node; and
wherein the switch slot determining module is configured to determine the switch slot offsets of the bandwidth part switching process for the respective cells in the serving node by performing any of the following operations:
  a. calculating, according to a subcarrier spacing type in each cell and a user terminal type, the required switch delays for the user terminal switching in the respective cells; and determining, according to a maximum value of at least one required switch delay, the switch slot offsets corresponding to the respective cells;
  b. determining a user terminal type according to capabilities of the user terminal, wherein the user terminal type comprises a first type and a second type; calculating the required switch delays for the user terminal type corresponding to respective subcarrier spacing types; and determining, according to a maximum value of at least one required switch delay, the switch slot offsets corresponding to the respective cells; or
  c. searching, according to a subcarrier spacing type in the active cell and a user terminal type, for the required switch slot offset for the user terminal in the active cell; determining an integer greater than or equal to the required switch slot offset as the switch slot offset of the active cell; and determining the switch slot offset of the passive cell from the switch slot offset of the active cell.

* * * * *